United States Patent [19]
Sulkin

[11] 3,763,576
[45] Oct. 9, 1973

[54] TEST SCORING APPARATUS
[75] Inventor: Theodor E. Sulkin, Easton, Pa.
[73] Assignee: Northern Electric Company Limited, Montreal, Quebec, Canada
[22] Filed: Mar. 15, 1971
[21] Appl. No.: 124,100

[52] U.S. Cl. .................. 35/48 R, 35/9 R, 35/32
[51] Int. Cl. ........................................ G09b 1/02
[58] Field of Search .............. 35/9 R, 9 E, 9 D, 35/48, 32, 30

[56] References Cited
UNITED STATES PATENTS

| | | | |
|---|---|---|---|
| 2,066,818 | 1/1937 | Beall | 35/48 A |
| 2,509,405 | 5/1950 | Zimmerman | 35/9 R |
| 2,311,217 | 2/1943 | Emmert | 35/48 R |
| 3,095,655 | 7/1963 | Berglund et al. | 35/30 |

Primary Examiner—Robert W. Michell
Assistant Examiner—J. H. Wolff
Attorney—Seidel, Gonda & Goldhammer

[57] ABSTRACT

An apparatus is provided for simplified scoring of tests and examinations, such as multiple-choice tests. The apparatus consists of a plurality of answer indicating slides each having a plurality of apertures corresponding to possible answers to a test question. At least one of the apertures of each slide is provided with a token, such as a ball bearing, representing the correct answer. After the examination an answer collecting slide having a plurality of openings is aligned with the apertures corresponding to the answers selected by the examinee. Wherever a correct answer was selected, the token is released from its aperture, and the total score is readily calculated. An apparatus for programming a plurality of scoring devices with the same answers is also provided.

8 Claims, 10 Drawing Figures

PATENTED OCT 9 1973 3,763,576

INVENTOR
THEODOR E. SULKIN

BY
Seidel, Gonda & Goldhammer
ATTORNEYS

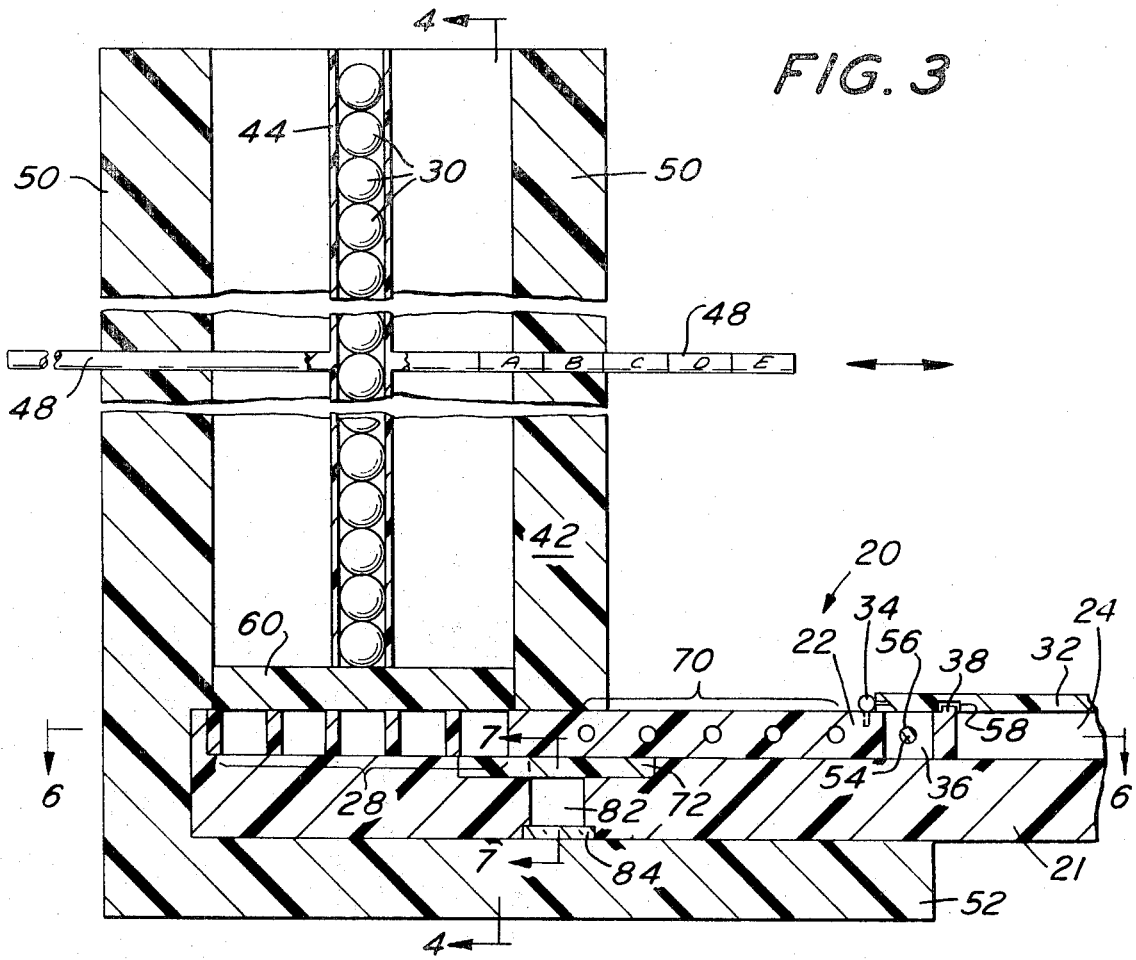
FIG. 3
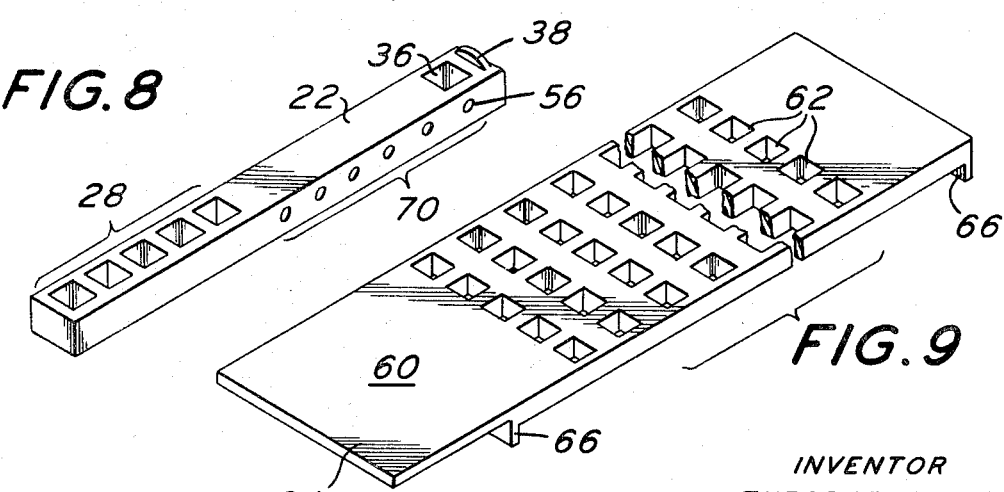
FIG. 8
FIG. 9
INVENTOR
THEODOR E. SULKIN
BY
Seidel, Gonda & Goldhammer
ATTORNEYS

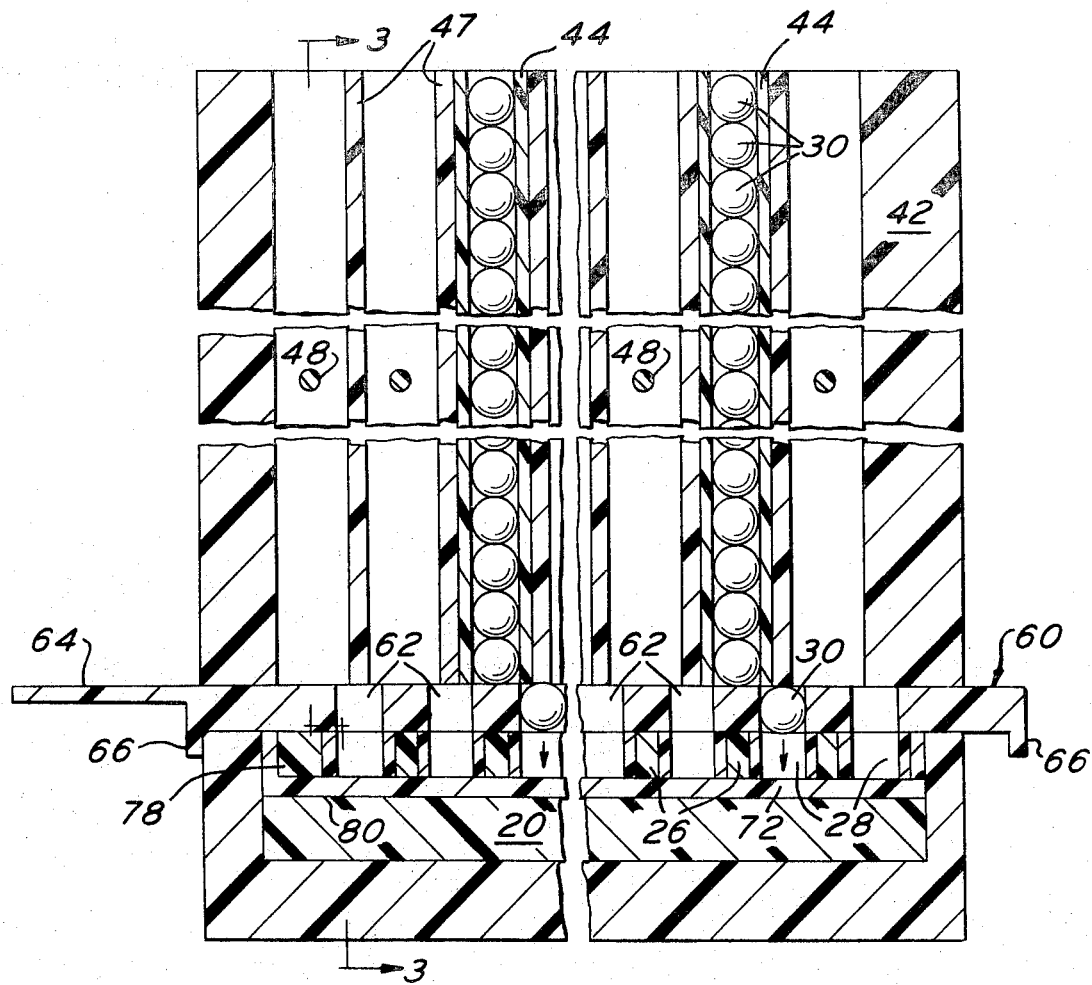
FIG. 4
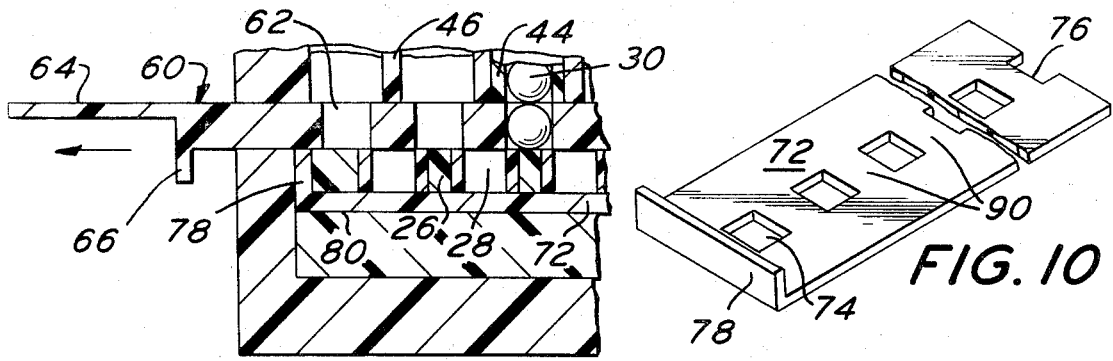
FIG. 5
FIG. 10
INVENTOR
THEODOR E. SULKIN
BY
Seidel, Gonda & Goldhammer
ATTORNEYS

TEST SCORING APPARATUS

The present invention relates to an improved apparatus for scoring tests and examinations. More particularly, the invention is directed to devices for administering multiple-choice examinations and quickly and automatically registering the examination score, as well as an apparatus for programming a plurality of such scoring devices:

The so-called "multiple-choice" examination, wherein the examinee selects one or more answers from a plurality of answers in response to a test question, has become an increasingly popular form of objective test. In the usual multiple-choice test the examinee indicates his answer by checking or circling the selected answer or a number or letter corresponding to the selected answer with a pencil. More commonly, the examinee is provided with a separate answer sheet having a plurality of answer spaces corresponding to possible answers to each question, and answers are indicated by filling in the appropriate space.

In either case, after the examination is completed, the answer sheet or question booklet must be collected by the examiner. The examination papers must then be graded either by hand, which is tedious and time consuming, or by machine, which requires expensive equipment. In either case, there is considerable delay between the taking of the examination and the completion of the scoring operation.

A number of scoring devices have been invented in the past which provide automatic and almost instantaneous scoring at the completion of the examiation. For example, U. S. Pat. No. 2,509,405 to Zimmerman shows a scoring device in which answers are selected by punching out small cardboard discs in the answer sheet. If the correct answer is selected, the disc falls into a channel, and the total score may be computed by counting the discs at the bottom of the channel. However, this device has the disadvantage that it may only be used once, since the answer card is rendered unusable once the discs have been punched out.

Another quiz device is shown in U. S. Pat. No. 2,311,217 issued to Emmert. This device comprises an advancing belt on which is printed a question with possible answers and a hole corresponding to the correct answer. The answer is selected by dropping a ball in one of a plurality of holes in the casing for the belt. If the answer selected is correct, the ball will fall through the answer hole in the belt and proceed to a score tabulating column. This device has the disadvantage of requiring a different answer sheet for each test, as well as the annoyance to the examinee of having to continually advance the belt. In addition, neither of the above devices permit the examinee to change his answer if desired.

A further example of a test scoring device is shown in U. S. Pat. No. 2,066,818 to Beall. This device comprises a series of holes following each question, and answers are indicated by placing a peg in the hole corresponding to the selected answer. Upon completion of the examination a panel having holes corresponding to the correct answers is aligned with the answer holes, thus allowing correct answer pegs to fall into a compartment where the score may be tabulated. This device also has the disadvantage of requiring a separate answer panel for each test.

Accordingly, it is an object of the present invention to provide an examination apparatus which will quickly and automatically tabulate the score.

It is a further object of the present invention to provide examination scoring apparatus which may be used over and over again for administering and scoring examinations.

Another object of the present invention is to provide an examination scoring apparatus which does not require a separate answer panel for each test.

Still another object of the present invention is to provide an examination scoring apparatus having universal application for a number of different tests.

It is a still further object of the present invention to provide an apparatus for programming a plurality of examiation scoring devices for administering the same test to a large number of examinees.

Other objects will appear hereinafter.

The above and other objects are achieved by the apparatus of the present invention which comprises a plurality of answer selecting slides each slide being movable between a plurality of apertures which define positions and having a plurality of answer compartments which correspond to possible answers to test questions, and collecting means which may be aligned with the apertures corresponding to selected answers in order to release indicia or tokens contained therein. The apparatus of the present invention may also include supply hoppers and a dispensing slide, for providing each answer selecting slide with at least one correct answer token or indicium.

For the purpose of illustrating the invention, there is shown in the drawings a form which is presently preferred; it being understood, however, that this invention is not limited to the precise arrangements and instrumentalities shown.

FIG. 3 is a partially fragmented sectional elevation view of the test scoring panel and programmer of the present invention, the section being taken on a plane substantially corresponding to line 3—3 of FIG. 4;

FIG. 4 is a partially fragmented sectional elevation view of the test scoring panel and programmer of the present invention, the section being taken on a plane substantially corresponding to the line 4—4 of FIG. 3;

FIG. 5 is a further fragmented sectional view similar to FIG. 4 showing the indicia dispensing slide of the programmer in a different position;

FIG. 8 is a perspective view of one of the answer selecting slides of the test scoring panel of the present invention;

FIG. 9 is a partially fragmented perspective view of the indicia dispensing slide of the programmer of the present invention;

FIG. 10 is a partially fragmented perspective view of the indicia collecting slide of the test scoring panel of the present invention.

Figure 2:
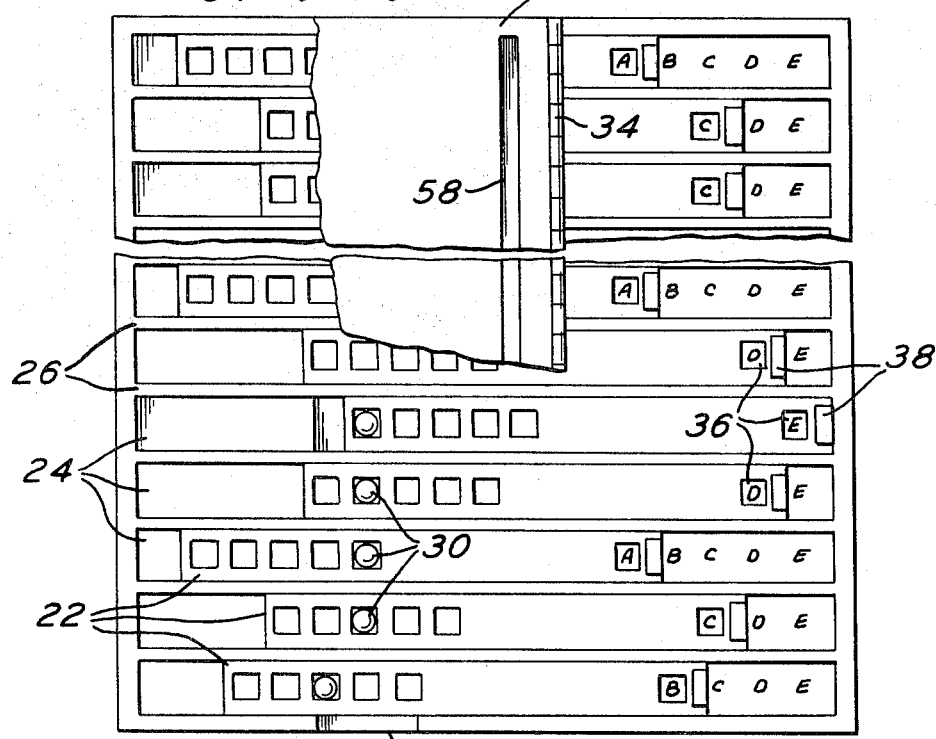
FIG. 2 is a partially fragmented plan view of the test scoring panel of the present invention with the cover partially broken away.

With reference first to FIG. 2, there is shown in plan view a test scoring panel, generally designated 20. The scoring panel 20 includes a plurality of answer selecting slides 22 which are supported on a base member 21. The slides 22 may be moved back and forth in slide channels 24 separated by panel partitions 26. The scoring panel 20 may be provided with any convenient number of answer selecting slides 22, such as 25, 50, 100, etc., corresponding to the usual number of questions in a multiple-choice examination.

Each answer selecting slide 22 has a plurality of indicia retaining compartments which may be apertures 28, which are open at the top and bottom, each aperture being capable of receiving and retaining a token or other indicium 30, such as a metal ball bearing. Each aperture 28 corresponds to a possible answer to a test question, and each answer selecting slide 22 may have as many apertures 28 as desired to correspond to the total number of possible answers for each question. A token or indicium 30 is placed in at least one of the aperture 28 of each answer selecting slide 22 and is supported in the aperture by base 21, the aperture selected corresponding to the correct answer to the question. Where it is desired to provide more than one correct answer to any question, a token 30 may be placed in each apertures 28 which corresponds to a correct answer. However, as will be seen later, in the present embodiment only one of the correct answers would be counted.

The left hand side of the scoring panel 20, as shown in FIG. 2, is provided with a cover 32 (partially broken away), mounted on a hinge 34. While the examinee is taking the test or examination, the cover 32 is swung to the left, as shown in FIG. 2, so that all of the apertures 28 on the left hand end of the answer selecting slides 22 are hidden from the view of the examinee. In this manner the examinee is prevented from seeing in which aperture the correct answer token 30 is located. If desired, the cover 32 may be provided with a suitable lock (not shown), such as a screw or hinged fastener.

Figure 6:
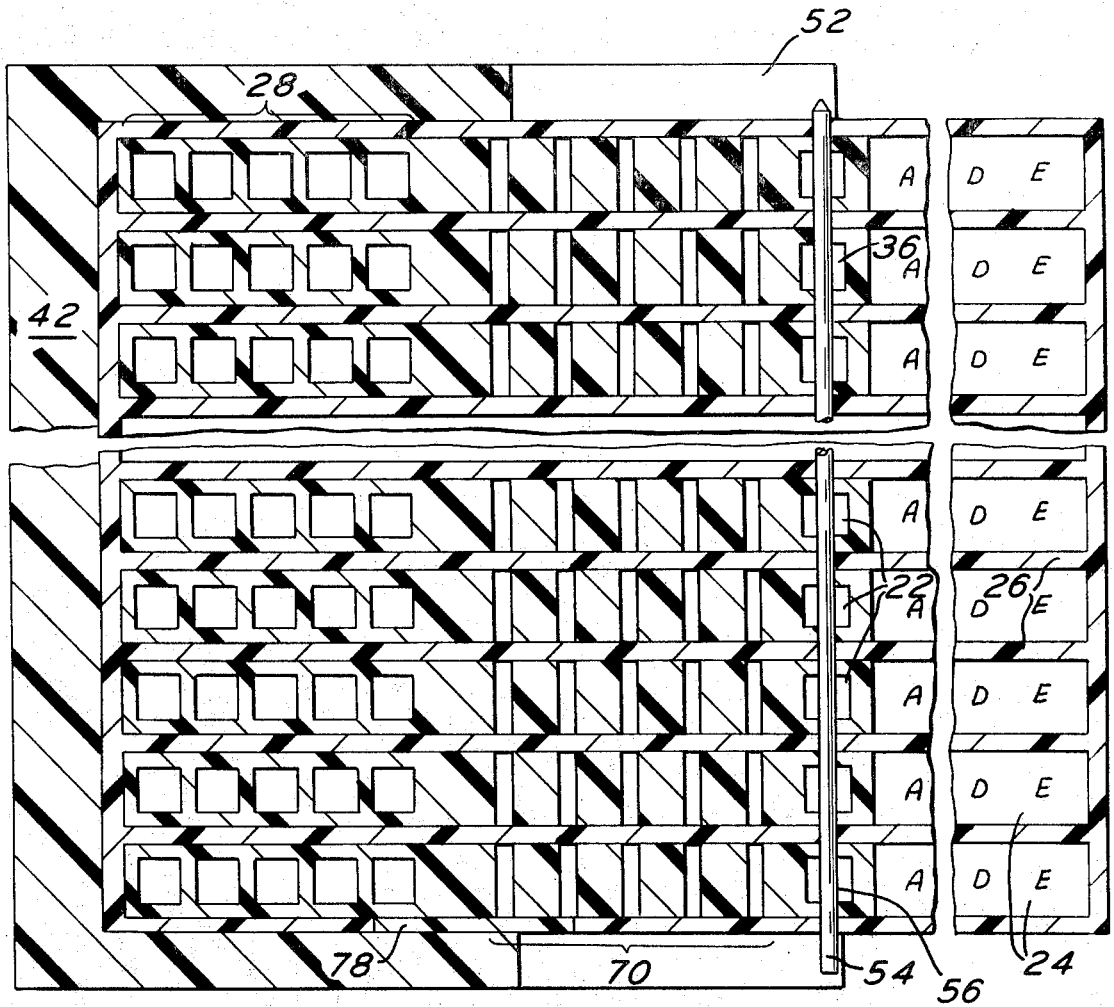
FIG. 6 is a partially fragmented plan view of the test scoring panel and programmer of the present invention, the section being taken on a plane substantially corresponding to line 6—6 of FIG. 3.

The opposite end of each answer selecting slide 22 is provided with an answer window 36 and an upwardly projecting slide tab 38. At the start of an examination all of the answer selecting slides 22 are at the extreme left end of the slide channels 24, as best shown in FIG. 6. In order to indicate his selected answer, the examinee pushes the answer selecting slide 22, corresponding to the particular question being answered, to the right. The slide is moved by pushing against the slide tab 38 with the thumb or finger until the letter, numeral, or other design corresponding to the selected answer appears in the answer window 36. The letters, numerals or other answer indicating figures are painted or otherwise inscribed on the bottom surfaces of slide channels 24. Thus, if the examinee thinks that the answer designated by letter A is correct, he pushes the answer selecting slide 22 to the right until the letter A appears in answer window 36. Such is the case with the first, fourth and eighth slides shown in FIG. 2.

By moving an answer selecting slide 22 to the right the apertures 28 and the token 30 placed in one or more of these apertures are also moved to the right along base 21 an equal amount. As can be seen best in FIG. 3, this movement results in positioning one of the apertures 28 of each slide 22 recess 82 in base 21 which serves as a tabulating channel. The recess 82 extends perpendicularly to the longitudinal axes of the slides 22. For example, if a slide 22 is moved one unit to the right so that the letter A appears in answer window 36, the indicia retaining aperture 28 which is farthest to the right on the slide will also be moved one unit to the right and therefore be positioned over recess 82. If an answer selecting slide 22 is moved three units to the right so that the letter C appears in the answer window, the apertures 28 will also be moved three units to the right so that the middle aperture 28 of the five compartments shown will be positioned above recess 82. Hence, it will be seen that the five indicia apertures 28 of each answer selecting slide 22 shown in FIG. 2 correspond to answers E, D, C, B, and A, reading from left to right.

Figure 1:
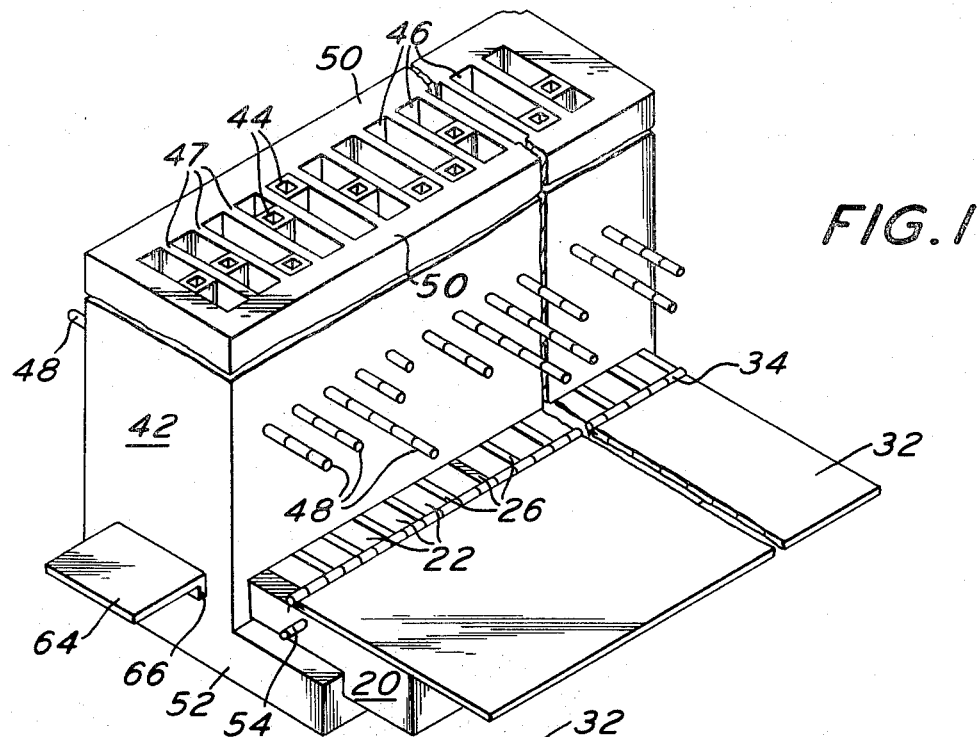
FIG. 1 is a partially fragmented overall perspective view of the test scoring panel of the presnt invention positioned in the programmer of the present invention.

Referring now to FIG. 1 the programmer, for the scoring panel 20 will now be described. The programmer comprises a housing 42 which includes plurality of vertically extending indicia supply hoppers 44 which may be moved back and forth in hopper channels 46 separated by partitions 47. Hoppers 44 are supported and moved back and forth in channels 46 by means of hopper rods 48 which extend from opposite sides of the hoppers parallel to the longitudinal axis of each hopper channel 46. As best shown in FIG. 3, hopper rods 48 extend through the walls 50 of programmer 42 so that the hoppers 44 may be moved manually from outside the programmer.

The housing 42 may contain any desired number of hoppers 44, but the number of hoppers should be at least equal to the number of answer selecting slides 22 of the scoring panel 20 to be programmed. Thus, each hopper 44 corresponds to one of the answer selecting slides 22 and will provdie a token or indicium 30 for one of the apertures 28 of the corresponding slide 22.

Hoppers 44 may be as tall as desired, so as to be capable of holding any desired number of tokens or indicia 30, corresponding to the number of test scoring panels 20 which it is desired to program. For example, if it is desired to administer a test to a large group of examinees, such as a class of fifty students, hoppers 44 may be provided which are tall enough to hold a vertical column of fifty tokens or indicia 30. In this manner the housing 42 will be capable of providing one token 30 to each answer selecting slide 22 of each of fifty test scoring panels 20. Furthermore, as long as the hoppers 44 are not moved during the programming of the fifty scoring panels 20, each answer selecting slide 22 of each scoring panel 20 will have a token 30 in the same aperture 28 as the corresponding answer selecting slide of every other scoring panel.

In order to determine the proper position for each hopper 44, at least one of the hopper rods 48 is marked with letters, numerals, or other figures corresponding to possible answers to each question. Thus, as shown in FIG. 3, the right hand hopper rod 48 may be labeled with letters A, B, C, D and E corresponding to five possible answers. In order to correctly position each hopper 44, hopper rod 48 is moved in or out until the letter corresponding to the correct answer appears just outside of housing wall 50. For example, if as shown in FIGS. 1 and 3, the answer to the last question is suppoed to be C, the hopper rod 48 is positioned so that the letter C appears just outside of housing wall 50. Hence, hopper 44 will be in the middle position so that a token 30 will be placed in the middle aperture 28 of the last answer selecting slide 22 of each scoring panel 20, as shown in FIG. 2.

The housing 42 is also provided with a tray 52 on which a test scoring panel 20 may be rested for insertion into the housing. Prior to the insertion of a scoring panel into the housing, all of the answer selecting slides 22 of the scoring panel 20 should be pushed to the extreme left hand end of the slide channels 24. The answer selecting slides 22 may be locked in this position by a locking rod 54 which may be inserted through locking hole 56 of each of the answer selecting slides 22 (see FIGS. 6 and 8). The cover 32 of scoring panel 20 is then flipped clockwise about its hinge 34 so that the left hand side of scoring panel 20 is uncovered, thus exposing all of the apertures 28. The left hand side of the test scoring panel 20 may then be inserted into the housing 42 as shown in FIG. 1.

It will be understood, of course, that the tray 52 could be dispensed with, in which case the housing 42 would merely be set on top of the left hand side of the scoring paenl and properly positioned by means of flanges or other appropriate indexes. Also, if desired, the cover 32 may be provided with a groove 58 which will receive slide tabs 38 when the cover is flipped clockwise over the right hand portion of the test scoring panel (see FIGS. 1 and 3).

When the left hand edge of the test scoring panel 20 is pushed all of the way into the housing, the five apertures 28 will be longitudinally aligned (see FIG. 3) but laterally offset (see FIGS. 4 and 5) beneath the five possible answer positions of the indicia supply hoppers 44, and will be vertically separated from the hoppers only by movable element 60. The movable element 60, which is shown in detailed perspective view in FIG. 9, comprises an elongated panel having a plurality of openings 62 which will just receive a single token or indicium 30 from supply hoppers 44. The movable element 60 is also provided with a handle 64 which projects from the housing 42 and end stops 66. The total number of openings 62 in the dispensing slide 60 corresponds to the total number of apertures 28 in the answer selecting slides 22 of the test scoring panel. Thus, in the embodiment shown there are five openings 62 in each row corresponding to the five apertures 28 in each slide 22 and also corresponding to the five possible answer positions of hoppers 42. Similarly, there are the same number of rows of openings as there are slides 22 and hopper channels 46.

The operation of movable elements 60 will now be described with particular reference to FIGS. 4 and 5. When the handle 64 of element 60 is pushed all of the way in against left hand end stop 66, openings 62 are completely out of alignment with supply hoppers 44 and directly in alignment with apertures 28, as shown in FIG. 4. In order to deposit a token 30 in one of the apertures 28 of each answer slide 22, the handle 64 of the movable element is first pulled all of the way out against right hand end stop 66, so that the movable element 60 is in the position shown in FIG. 5. In this position openings 62 are in complete alignment with hoppers 44. Consequently, the column of tokens 30 in each hopper 44 will drop by gravity, so that one and only one token 30 will drop into one opening 62 in each row of movable element 60.

Secondly, after a token 30 drops into an opening in each row of movable element 60, handle 64 of movable element 60 is pushed back in against left hand end stop 66 as in FIG. 4. This movemnet will realign each opening 62 with its corresponding aperture 28, and tokens 30 held in filled openings 62 of element 60 will drop into the corresponding apertures 28 as indicated by the arrows in FIG. 4. The programmed scoring panel 20 may then be removed from the housing.

When the next scoring panel to be programmed is inserted into the housing and movable element 60 is pulled out, the next token in each hopper 44 is released into the appropriate opening 62, as in FIG. 5. The second step above is then repeated to drop the tokens into the next scoring panel. It will be understood, of course, that in the above procedure when the first scoring panel 20 to be programmd is inserted into the housing, there will be no tokens trapped in slide 60 as in FIG. 4. It will also be obvious that the above steps could be reversed so that each scoring panel 20 is inserted and removed while movable element 60 is in the position shown in FIG. 5. Element 60 would then be pushed in and pulled out to respectively load panel 20 and refill openings 62.

To administer an examination, cover 32 is flipped counterclockwise to cover the left hand portion of the test scoring panel 20 and locking rod 54 is removed so that answer selecting slides 22 may be moved to the right. After the examinee has selected and indicated his answers, locking rod 54 may be reinserted into the holes in the scoring panel. The locking rod will pass through the appropriate answer locking hole 70 in each answer slide 22, depending upon the position of each particular slide. It is preferable that locking rod 54 be pointed on one or both ends and that the answer locking holes 70 be slightly larger than necessary so that the locking rod may be easily inserted, even if some of the answer slides have not been precisely positioned.

The examination may then be scored by means of a second movable element 72, which is shown in detail in FIG. 10. The movable element 72 consists of a plurality of openings 74 just large enough so that a token or indicium 30 may pass therethrough. The number of openings 74 corresponds to the number of answer selecting slides 22. However, it will be noted that opening 76 at the right hand end of element 72 in FIG. 10 is not completely enclosed. This mrely permits the entire movable element 72 to be totally contained within the framework of the scoring panel 20. Element 72 is also provided with an upwardly projecting tab 78, which is used to move the element 72 back and forth in its channel 80 in a direction transverse to the direction of movement of the answer selecting slides 22.

Figure 7:
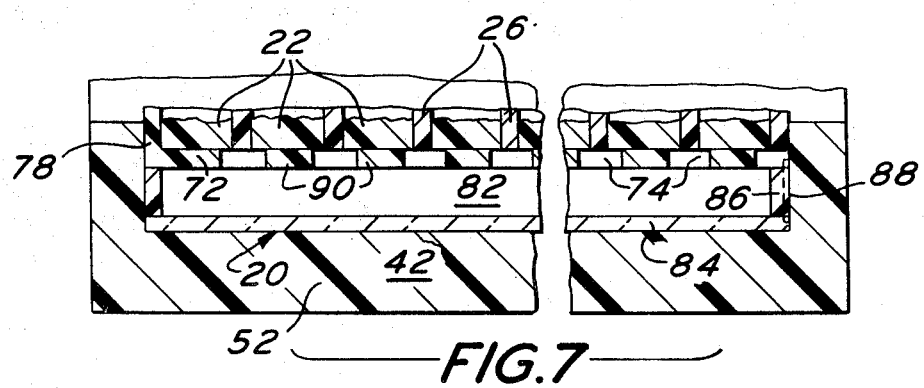
FIG. 7 is a partially fragmented sectional elevation view primarily of the test scoring panel, the section being taken on a plane substantially corresponding to the line 7—7 of FIG. 3.

Beneath the second movable element 72 is located the tabulator recess 82, as best shown in FIGS. 3 and 7. The recess 82 is so positioned as to be aligned directly beneath openings 74 of the second movable element 72 and is just wide enough to receive tokens 30. The recess is also provided with a transparent wall 84 in the bottom of the base 21, so that the number of tokens received in the recess 82 may be readily counted. If desired, the wall 84 or sides of the recess 82 may be provided with appropriate indexes so that the number of tokens received in the recess may be directly read from the index adjacent the last token. The is also provided with a door 86 by which the tokens may be removed. The door may suitably be provided with a hinge 88.

It will also be understood tht the scoring panels 20 could be suitably designed to accommodate longer recesses such as shown in U. S. Pat. No. 2,509,405. Such compartments could be straight, U-shaped or tortuous.

The second the element 72 and tabulator recess 82 are so positioned in the test scoring panel that when the answer selecting slides 22 are moved to the right, the appropriate aperture 28 corresponding to the answer selected by the examinee will be aligned above the recess 82. During During examination the movable element 72 is positioned to the right in channel 80 so that tab 78 is flush with the left end of panel 20, as shown in FIGS. 4 and 7. In this position openings 74 in collecting slide 72 are out of alignment with answer selecting slides 22, as best shown in FIG. 7. Hence, the partitions 90 between openings 74 will block the bottom openings of apertures 28 which are positioned or pass over the element 72. Therefore, it will be evident that during the examination it is impossible for a token 30 to fall into the recess 82. This permits the examinee to change his answer, while at the same time preventing him from obtaining the correct answer simply by moving each answer slide 22 to the right until he hears a token drop.

After the examination has been completed, the second movable element 72 is moved to the left in its channel 80 by means of tab 78 until openings 74 are aligned with a aperture 28 of each answer slide 22. The aligned aperture will correspond to the answer selected by the examinee for each particular question. If the examinee has selected the correct answer, the aperture 28 which is positioned above movable element 72 will contain a token or indicium. Hence for each correct answer a token will drop through an opening 74 of element 72 into recess 82. On the other hand, wherever an incorrect answer has been selected by the examinee, one of the empty apertures 28 will be positioned above the movable element 72, and consequently no token will drop into the recess 82 from that particlar answer slide. Therefore, the total number of tokens received in the recess 82 will be equal to the total number of correct answers.

After the tokens have dropped into the recess 82, element slide 72 is pushed back to the right, so that the tokens will not fall back into answer slide apertures 28 when the scoring panel is inverted or stood on end. If the transparent window 84 or recess 82 has been provided with appropriate indexes, the total score may be easily read simply by standing the scoring panel on end and reading the height of the column of tokens.

Although there should be no difficulty in determining by "feel" the proper left hand (aligned) position of element 72 when collecting the correct answer tokens, a suitable end stop or marking may be provided to indicate the aligned position. Also, to prevent accidental or intentional movement of element 72 before or during the examination, a suitable lock (not shown) may be provided.

The overall operation of the apparatus of the present invention will now be briefly described with particular reference to FIG. 1 and 2. After a test has been prepared and the correct answers selected, the examiner moves the appropriate indicia supply hopper 44 for each question to its proper position by means of hopper rods 48. A test scoring panel 20 with all of the answer selecting slides 22 pushed to the left and locked in position and with cover 32 flipped clockwise is inserted into the programmer 42. First movable element 60 is then pulled out and pushed in in order to release one token from each hopper into the appropriate aperture 28 of each answer slide 22. The scoring panel is then removed from the programmer, the cover 32 is flipped counterclockwise to cover the left portion of the scoring panel and locking rod 54 is removed. Additional test scoring panels are then successively programmed in the same manner without moving supply hoppers 44, so that the same test may be administered to a number of examinees.

Each examinee then takes the examination indicating his answers by moving answer slides 22 to the right. Any answer may be changed by moving the answer slide back and forth at any time before locking rod 54 is inserted through answer locking holes.

In the particular set-up shown in FIGS. 1 and 2 the examiner has programmed the test so that the correct answers to the last six questions are C, E, D, A, C, and C, respectively as shown in FIG. 1. Consequently, tokens have been placed in the third, first, second, fifth, third and third apertures 28 respectively of the last six answer selecting slides 22 as shown in FIG. 2. However, the examinee has selected D, E, D, A, C and B respectively as the answers to the last six questions.

Hence, for only four of the six questions is a token containing aperture positioned over the movable element 72, and in two cases (i.e., the last and sixth to last slides) an empty aperture is positioned above the element 72. Therefore, when the element 72 is moved to its aligned position, only four tokens out of the last six answer slides will fall into the recess 82. Thus, it will be seen that the total score may be readily tabulated by counting the number of balls received in the recess.

It will be understood by one of ordinary skill in the art that the apparatus of the present invention may be made of any desired material and any desired size. For example, the programmer and scoring panels could be made of any suitable hard plastic, or even metal or wood, while the tokens could be small steel, brass or other metal ball bearings. Using ball bearings having a diameter of about 4 millimeters and 5 millimeter square hoppers and compartments, a fifty question scoring panel could be made which would be less than 2 feet long, 6 inches wide and about ¾ inch thick. However, any other size could be made also.

It will also be understood that the apparatus of the present invention can be used for other purposes besides tests and examinations, such as quiz games, statistical surveys, etc.

The present invention may be embodied in other specific forms without departing from the spirit or essential attributes thereof and, accordingly, reference should be made to the appended claims, rather than to the foregoing specification as indicating the scope of the invention.

I claim:

1. A test scoring apparatus comprising a housing and a scoring panel, said housing supporting a first means for storing a token in one of a plurality of locations therein, said panel comprising a base and a first member having a plurality of apertures, each of said apertures being aligned with one of said locations of said first token storing means to enable a token stored at one of said locations to enter said aligned aperture, said base comprising a recess for collecting tokens, said first member being mounted on said base for sliding movement relative thereto to enable each of said apertures to be selectively aligned with said recess, a first element disposed between said first token storing means and said plurality of apertures in said first member, said element being movable to selectively permit a token in said first token storing means to enter one of said apertures, and a second element disposed between said first member and said recess, said element being movable to selectively permit a token to enter said recess from one of said apertures aligned therewith.

2. A test scoring apparatus as defined in claim 1 wherein said housing includes at least a second means for storing a token in one of a plurality of locations therein, and said scoring panel has at least a second member with a plurality of apertures, said second means for storing a token and said second member being disposed substantially adjacent to said first means and said first member so that said second member is slidable on said base, said first and second elements each being panels with openings therein that are slidably movable relative to said apertures in said first and second members, said openings in said first element being selectively alignable with said apertures in said first and second members, and with said first and second means so that tokens in said first and second means can selectively enter said apertures in said first and second members when said first element is moved, and said second element being selectively alignable with said apertures in said first and second members and said recess so that tokens in said apertures can selectively enter said recess when said second element is moved.

3. A test scoring apparatus as defined in claim 1 wherein said recess is provided with a transparent wall to permit tokens therein to be observed.

4. A test scoring apparatus as defined in claim 1 including a plurality of partitions on said base, said partitions defining slide channels, a member slidably mounted in each of said channels, and means for locking said members in fixed positions in their respective channels.

5. A test scoring apparatus as defined in claim 4 wherein said locking means comprises a plurality of locking holes in each of said members and a hole in each of said partitions, said holes in said partitions being in alignment with each other, said holes in said members being selectively alignable therewith, and a rod slidably receivable in all of said holes in said partitions and said aligned holes in said members for locking of said members in said slide channels.

6. A test scoring device comprising a base, a plurality of members mounted on said base, means for sliding said members relative to said base, said base having a recess and said members each having a plurality of apertures, each of said apertures in said members being selectively alignable with said recess to enable a token in said aligned apertures to enter said recess, an element disposed between said members and said recess, said element being movable in a direction transverse to the direction of movement of said members and having a number of openings therethrough which is the same as the number of said members, said openings in said element being selectively alignable with said recess and said aligned apertures so that a token can be selectively permitted to enter said recess from said aligned apertures.

7. A test scoring device as defined in claim 6 including a plurality of partitions on said base, said partitions defining a plurality of channels, and one of said members is mounted in each of said channels.

8. A test scoring device as defined in claim 7 including means for locking said members in fixed positions in their respective channels, said means comprising a plurality of locking holes in each of said members and a hole in each of said partitions, said holes in said partitions being in alignment with each other, said holes in said members being selectively alignable therewith, and a rod slidably receivable in all of said holes in said partitions and said aligned holes in said members for locking of said members in said slide channels.

* * * * *

UNITED STATES PATENT OFFICE
CERTIFICATE OF CORRECTION

Patent No. 3,763,576  Dated October 9, 1973

Inventor(s) Theodor E. Sulkin

It is certified that error appears in the above-identified patent and that said Letters Patent are hereby corrected as shown below:

In the heading of this patent cancel "assignor to Northern Electric Company Limited, Montreal, Quebec, Canada".

Signed and sealed this 12th day of February 1974.

(SEAL)
Attest:

EDWARD M. FLETCHER, JR.
Attesting Officer

C. MARSHALL DANN
Commissioner of Patents